United States Patent [19]

Grigoli et al.

[11] Patent Number: 4,986,080
[45] Date of Patent: Jan. 22, 1991

[54] MACHINE FOR MAKING ICE CREAM AND WATER ICES HAVING TWO OR MORE CONCENTRIC OR ANYHOW COMBINED LAYERS, IN PARTICULAR ICE LOLLIES, AND A METHOD UTILIZING THE MACHINE

[75] Inventors: Franco Grigoli; Franco Trabacchi, both of Milan, Italy

[73] Assignee: Sidam S.R.L., Cormano, Italy

[21] Appl. No.: 458,180

[22] Filed: Dec. 28, 1989

[30] Foreign Application Priority Data

Feb. 24, 1989 [IT] Italy .................... 19558 A/89

[51] Int. Cl.$^5$ .............................................. A23G 9/26
[52] U.S. Cl. .............................................. 62/75; 62/345;
425/126.2; 426/100; 426/101; 426/515; 426/565
[58] Field of Search ............... 62/345, 75; 425/126.2, 425/117, 130, 134; 426/100, 101, 249, 515, 565

[56] References Cited

U.S. PATENT DOCUMENTS

| 1,900,355 | 3/1933 | Maurer | 426/515 X |
| 2,048,364 | 7/1936 | Willems | 426/101 |
| 2,176,408 | 10/1939 | Peterson | 426/101 X |
| 2,288,970 | 7/1942 | Weisbender | 426/101 X |
| 2,614,047 | 10/1952 | Turner | 426/100 X |
| 2,975,732 | 3/1961 | De Pasquale | 426/249 |
| 4,546,615 | 10/1985 | Gross | 62/345 X |
| 4,759,197 | 7/1988 | Franco et al. | 62/345 |

Primary Examiner—William E. Tapolcai
Attorney, Agent, or Firm—McGlew and Tuttle

[57] ABSTRACT

A machine for making two-flavor ices, in particular ice lollies, comprising a freezing tank (2) through which parallel rows of molds (A, B) whose cross-sections are inscribable into one another are caused to advance intermittently at two-step rate, a metering-filling unit (6) for filling molds (A), a stick-inserting unit (7), an intermediate withdrawing station (10) in which ices are removed from molds (A) and then released into molds (B), a second metering-filling unit (11) for completing filling of molds (B), and a final withdrawing unit (8).

6 Claims, 6 Drawing Sheets

MACHINE FOR MAKING ICE CREAM AND WATER ICES HAVING TWO OR MORE CONCENTRIC OR ANYHOW COMBINED LAYERS, IN PARTICULAR ICE LOLLIES, AND A METHOD UTILIZING THE MACHINE

This invention is related to a machine for making double-flavor ices and/or ice lollies, in particular water ices, to a method of producing said ices, and to ices obtained by using such a machine and/or method.

The invention also relates to the thus obtained products—ices and water ices—which show to consist of two or more different layers, for example, differing in color or type, which layers may be either concentric to one another or combined in any other way, the products showing a sharp boundary line between the different layers so as to consist of differently shaped, thoroughly interconnected geometrical solids.

According to a known technique, a linear machine for making ices includes a number of molds arranged in parallel rows which are caused to intermittently advance through a freezing tank by means of a conveying chain.

At the start of a cycle, that is at the inlet of the tank, a metering device injects a correct quantity of product in liquid-fluid state into the molds in each rows of molds.

At an intermediate location in the freezing tank there is a stick-inserting device which inserts sticks into the molds in each row of molds when the product starts to solidify.

Provided at the outlet of the freezing tank are withdrawing bars which are in turn operated by a conveying chain to remove products from the molds in each row of molds and to release the products which are then moved to a paperwrapping station.

With such a type of machine, which does usually not permit diversified products to be obtained during a work cycle, multiflavor ices can only be produced in a conventional manner, that is, for example, as superposed-layer ices, by injecting in successive steps different products into the molds that are advancing through the freezing tank.

U.S. Pat. No. 4,759,197 (to SIDAM s.r.l.) discloses an ice-making machine operating on a double-step principle, namely in which rows of molds are caused to advance two by two, the machine being provided with double metering devices, double stick-inserting devices, double withdrawing bars.

Such a machine has substantially increased productivity as compared with a normal step machine and permits diversified products to be obtained during one and the same work cycle, by using different products or products different in color in the two metering devices, and/or rows of molds alternatively different in design or shape.

The invention proposes a particular adaptation of the machine disclosed in the above U.S. Patent granted to this Applicant. By this adaptation, which is the result of suitable modifications to the machine referred to above, the machine of this invention is enabled to carry out a method of producing double-flavor ices not obtainable with the machines and methods of the conventional types.

The machine according to this invention, which operates on a double-step principle, namely in which two rows of molds are fed at a time, utilizes rows of molds alternatively of two different shapes whose cross-sections are inscribable into one another. The metering, stick-inserting, withdrawing devices will act, when in operation, on one row of molds, rather than on two, and the invention provides an intermediate withdrawing station, -followed by a second metering station, -in which products are withdrawn from molds in rows of one type of molds and introduced into molds in rows of the other types of molds.

With such a type of machine, the method according to the invention comprises the steps of:- causing two rows of molds to be advanced at a time; performing a first metering-filling operation to charge a given product into molds in each row of a first type of molds whose cross-section is inscribable into cross-section of molds in adjacent rows of a second type of molds which are advanced in an empty condition; inserting sticks into molds of said first type when product therein starts to solidify; at an intermediate location in freezing tank, withdrawing products from molds of said first type and introducing these withdrawn products into molds in row of molds of the second type; performing a second metering-filling operation in order to fill-up inoccupied spaces between the inner surface of molds of the second type and the outer surface of products from the first type of molds; and performing final withdrawing of products from molds of the second type.

The thus obtained product, in particular an ice product and more particularly an ice lolly (or "stick up" water ice), is formed of a core portion and an at least partial covering portion possibly with relief- and/or undercut-portions being included, wherein the core and covering portions are of two different flavors.

The above and further features of the invention will be better understood when reading the following description made in connection with one embodiment thereof shown, by way of a non restrictive example in the accompanying drawings, in which.

With reference to the above figures, numeral 1 designates a machine for making ices according to the invention as a whole.

This machine is shown as applied to the production of ice lollies, in particular water ices, but it is understood that it may be used for making other types of ices, or possibly other products.

Figure 1:
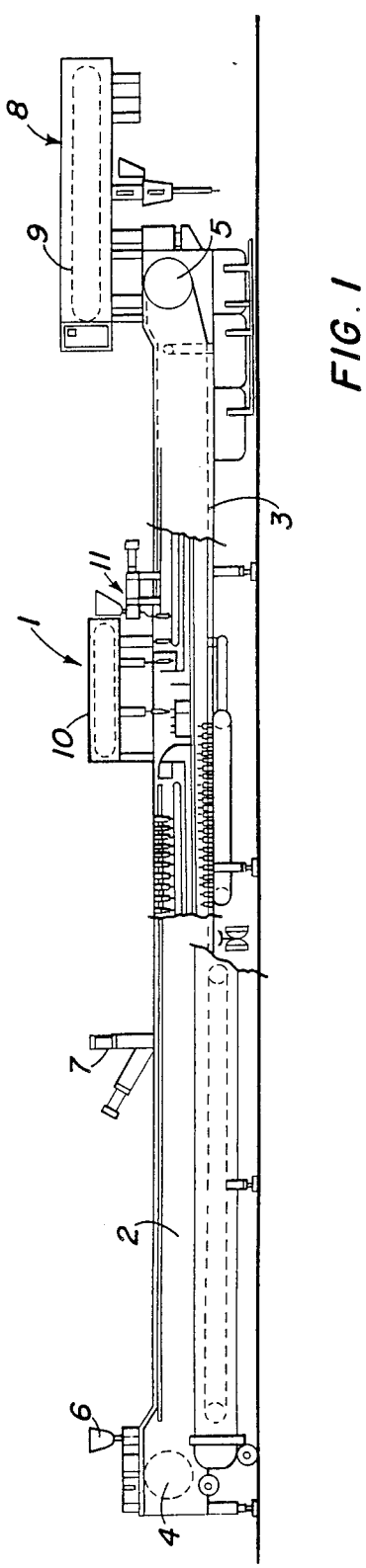
FIG. 1 is a schematic side elevational view with cutaway portions, showing a machine for making double-flavor ices according to the invention.

The machine 1 is of linear type and includes a freezing tank 2, through which parallel rows of molds are intermittently advanced from left to right in the drawings, by means of an endless conveying chain 3 running over end chain wheels 4 and 5 (FIG. 1). The rows of molds have been alternatively designated by references A and B in order to make evident that the molds in the rows are alternatively of two different types, as better explained below.

In a conventional manner, at a location above the inlet to the freezing tank 2, there is a metering-filling unit 6 from which the molds in a row of molds positioned thereunder, are filled with product in a liquid condition. Following the unit 6, there is a stick-inserting unit 7 designed to insert sticks in respective underlying molds in which the product already starts to solidify. At the outlet of freezing tank, there is provided a withdrawing unit 8 comprising a series of parallel arranged, equally spaced-apart withdrawing bars intermittently driven by a conveying chain 9, which bars are intended for withdrawing the ices from the molds at an initial part of said withdrawing unit, possibly plunging them into a bath of covering product, and finally releasing the products to move them to a paperwrapping station. The final withdrawing unit is not a specific part of this invention and, therefore, it will not be described in further details.

The machine of the invention is a double-step machine namely with two rows of molds being advanced at a time, as described in U.S. Pat. No. 4,759,197.

According to this invention, the molds A in one row are different in shape from molds B in the next adjacent row, as already mentioned herein before. In particular, the cross-section of molds A is inscribable into cross-section of molds B as schematically shown by examples in FIG. 4.

As used herein, the term "inscribable" means that the profile of a mold-A cross-section has certain points of contact with the profile of a mold-B cross-section, in such a way that when a product from a mold A is charged into a mold B, it will maintain a thorough axial relationship with the latter mold without undergoing any inclination which would prevent or, in any case, be detrimental to final withdrawing.

Figure 2:
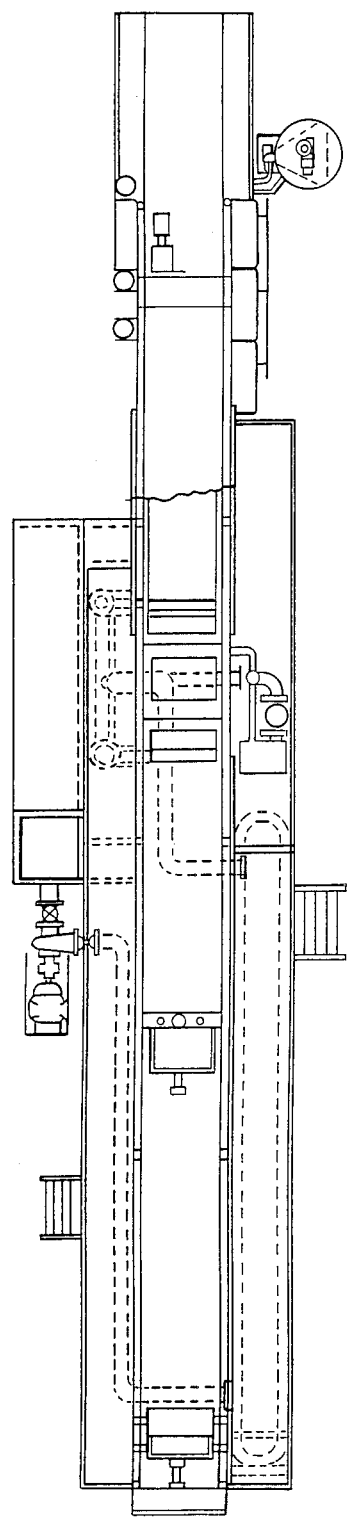
FIG. 2 is a top view of the machine in FIG. 1.

According to a further feature of the invention, the machine 1 is provided at a location above the freezing tank 2 intermediate to stick-inserting station 7 and final withdrawing station 8, with an intermediate withdrawing station 10 wherein products in molds A are removed from these molds A, caused to translate and then charged into respective molds B. This intermediate withdrawing station is followed by a second metering-filling station 11 (FIG. 2).

In general, operation of the machine is as follows.

Figure 3:
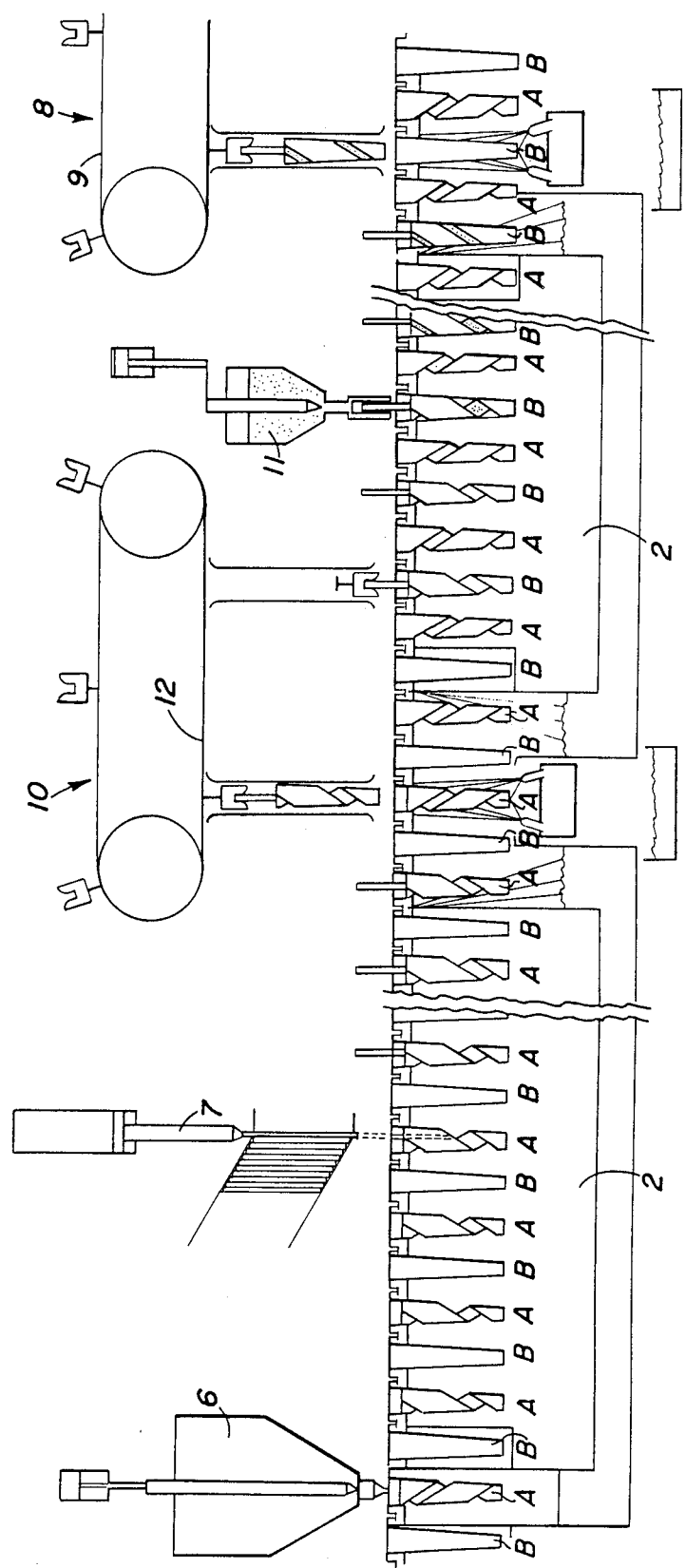
FIG. 3 is a sectional view of certain parts of the machine in FIG. 1.

At each shot, that is to say at each advance of the chain 3 conveying the molds, which advance results in the machine performing one metering-fillig operation, one stick-inserting operation, one withdrawing operation, and so on, each row of molds is caused to advance two steps, whereby a row of molds A is brought to a position beneath the first metering-filling unit 6 to be filled with ice product in liquid condition, as schematized in FIg. 3.

At a next shot, the molds B in row of molds following the just filled molds A, are moved past the meter-filling unit 6 to remain in empty state, while a new row of molds A is brought to a position below the unit 6.

At the same time, the stick-inserting unit 7 inserts sticks into molds in row of molds A positioned below, in which molds A the contained products starts to solidify. The product in molds A will be throughout solidified when reaching the inlet to intermediate withdrawing station 10, at which station both the filled molds A and empty molds B will arrive, as shown in FIg. 3.

At intermediate withdrawing station 10, the products in each row of molds A are removed therefrom, caused to translate horizontally and then charged into molds in a corresponding, more advanced row of molds B (FIG. 3).

In order to facilitate withdrawal of products from molds A, these latter are subjected to thawing in a manner known per se, as for example, by the aid of water at a given temperature sprayed from below the molds, as schematically shown in FIG. 3.

It is to be noted that the steps of intermediately withdrawing products from molds A and introducing same products into molds B are only schematized in FIG. 3, where charging operation is shown to occur far downstream from intermediate withdrawing operation. In such a case, it is to be intended that during the time a row of products are removed from molds A and another row of products are charged into molds B, as shown in FIG. 3, further rows of products are travelling on conveying chain 12 of station 10, in preparation to their being released into corresponding rows of molds B.

It should in any case be apparent that, consistent with mechanical limitations of the machine, introduction of products into molds B may occur much nearer the region where products are removed from molds A: in theory, it may even occur into molds in the row of molds B immediately adjacent the row of molds A from which the products are removed.

Subsequent to intermediate withdrawal of product at station 10, the molds A remain in empty condition, so that, from that time on, the rows of molds B become the operative rows of molds.

Figure 6:
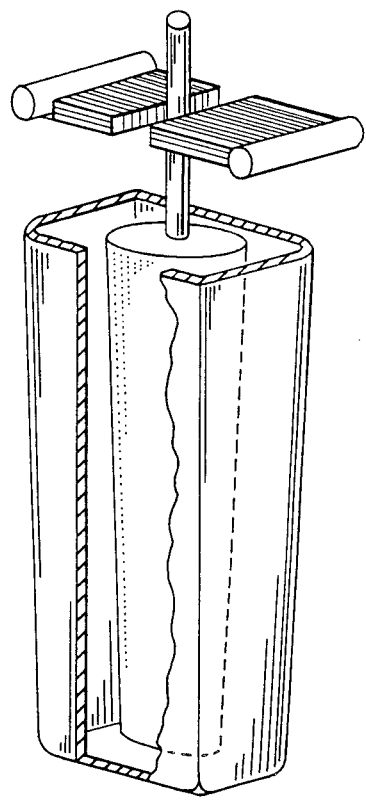
FIG. 6 is a part sectional view of a mold during the freezing stage of product charged therein.

The products may also have shapes whose cross-sections are not compulsorily in contact with one another except at the bottom. In such a case, mechanical supports will be provided by which the product A having already a stick inserted into it, is held in straight condition once the product has been charged into mold B, said supports being, for example, a pair of oppositely arranged brush means, as shown in FIG. 6.

The second metering-filling unit 11 provided downstream the intermediate withdrawing station 10 injects a second product in liquid condition into molds in a row of molds B positioned thereneath, so as to fill the spaces left between the inner wall of each mold B and the outer surface of the product which has been previously charged into same molds B from corresponding molds A.

Following the second metering-filling operation, the product is further advanced through the freezing tank 2 to permit solidification of the injected second substance, and is then withdrawn by final withdrawing unit 8 to be moved to a conventional paperwrapping station in a manner known.

It should be apparent that all of the above described operations are performed simultaneously. In other words, with the machine working under normal conditions, each 'shot' of the machine, namely each two-step advance, results in the machine carrying out the following operations: first metered filling with products the molds A; insertion of sticks into products; intermediate withdrawal of products from molds A; releasing of withdrawn products into molds B; second metered filling with products the molds B; final withdrawing of products from molds B.

Figure 5:
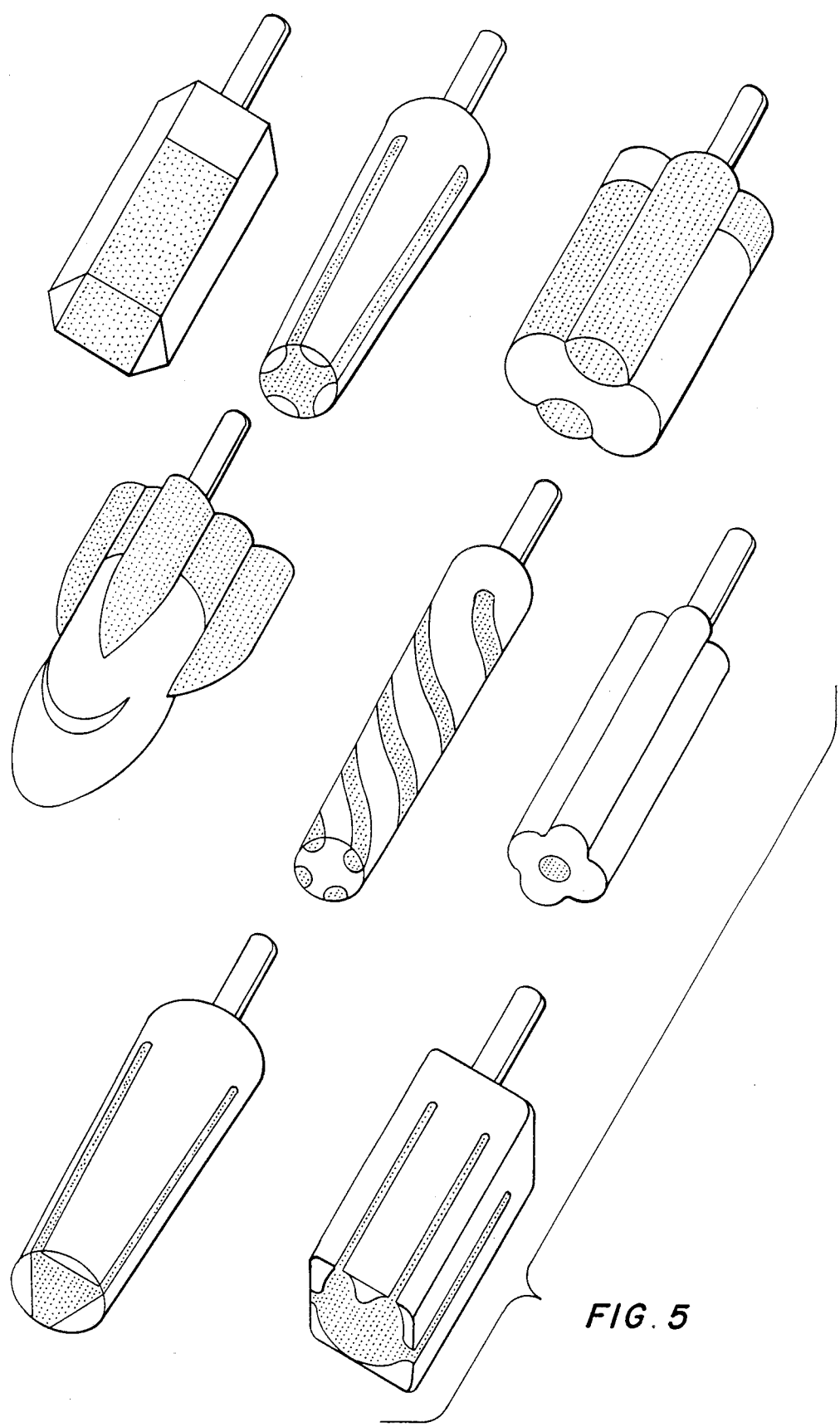
FIG. 5 shows examples of products that can be obtained by the method of the invention.

The products, in particular ice lollies ('stick-up' ices), that can be obtained according to the invention by the machine and method as described herein above and shown in the accompanying drawings, are two-flavor ices having a central core of one flavor and an at least partial outer covering, possibly with relief and/or undercut portions being included therein, of another flavor. FIG. 5 gives several examples of products that are obtainable by the method of the invention. This, obviously, irrespective of the fact that the product could have a further coating evenly provided thereover by dipping it into a bath of product.

By varying the shapes of molds A and B—as long as the cross-section of a mold A is inscribable into the cross-section of a corresponding mold B (the meaning of the word "inscribable" being as specified above)—an infinite variety of double-flavor products can be obtained with the machine and method of the invention.

Figure 4:
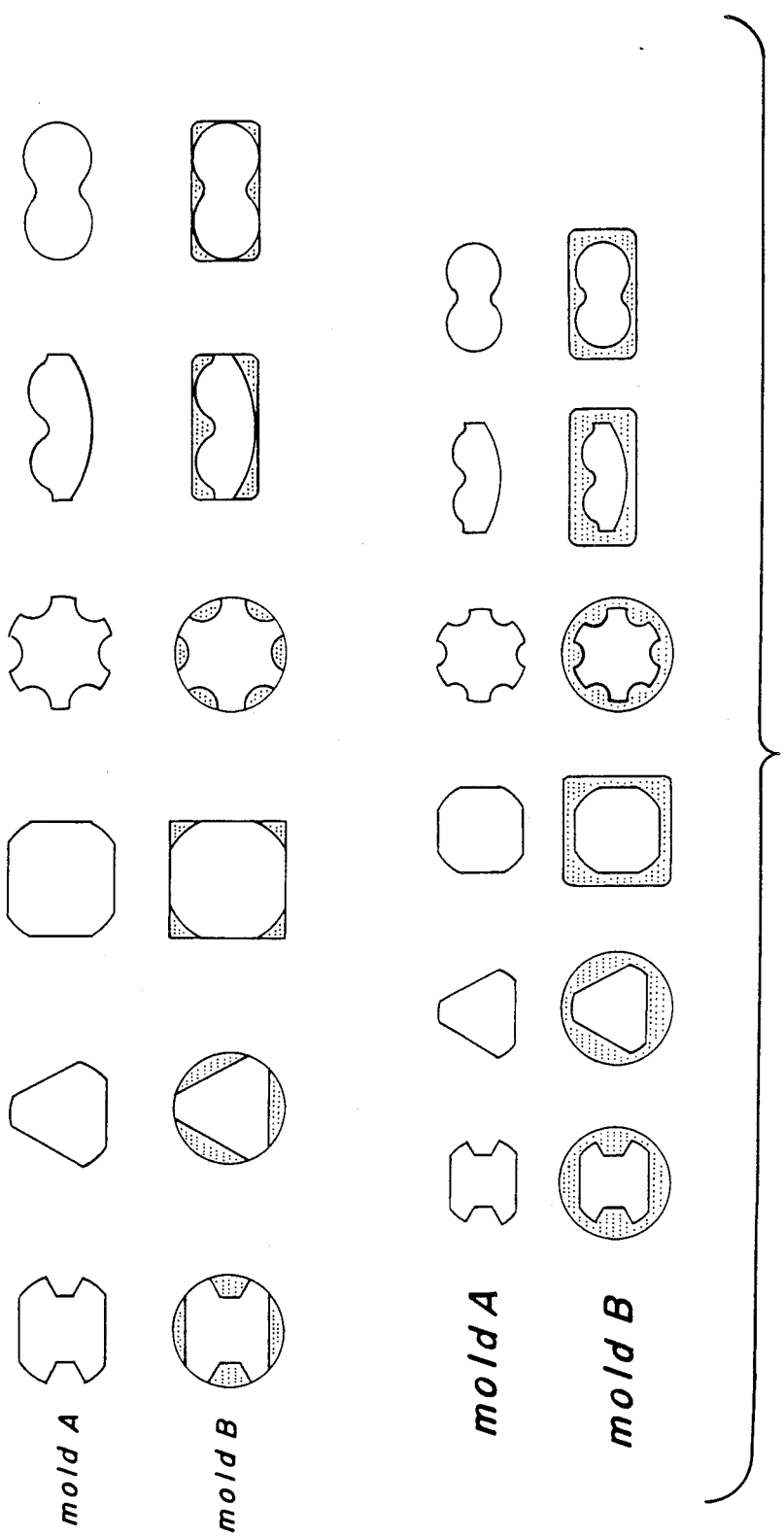
FIG. 4 shows several examples of molds A and B, wherein the cross-sections of molds A are respectively inscribable into cross-sections of molds B.

Thus, for example, FIG. 4 shows both the cross-sections of several products as withdrawn from respective molds A and, given below each of them, the cross-sections of corresponding final products as withdrawn from respective molds B.

While one particular embodiment of this invention has been described herein before and shown in the accompanying drawings, it is to be intended that several changes may be made thereto as to the details of construction, without departing from the spirit and scope of the invention.

We claim:

1. A machine for making double-flavor ices, in particular ice lollies, such as water ices and the like, comprising a freezing tank (2) through which parallel rows of molds (A, B) are intermittently advanced by means of a conveying chain (3), a first metering-filling unit (6) designed to fill the molds in a row of molds (A), a stick-inserting unit (7), and a final withdrawing unit (8), characterized in that each row of molds (A) is interposed between respective rows of molds (B), with the cross-section of a mold (A) being inscribable into the cross-section of a corresponding mold (B), and in that an intermediate withdrawing station (10) is provided at a location on freezing tank (2) intermediate to the stick-inserting unit (7) and the final withdrawing unit (8) and is followed by a second metering-filling unit (11.)

2. The machine according to claim 1, wherein said intermediate withdrawing station (10) is intended for withdrawing products from molds in a row of molds (A) and for charging them into molds in a row of empty molds (B), and said second metering filling unit (11) is intended for injecting substance in liquid condition into spaces between the inner wall of molds (B) and the outer surface of products contained therein.

3. The machine according to claim 2, wherein before the products removed from molds (A) are charged into molds (B), they are caused to translate in a direction in which the conveying chain (3) is running.

4. The machine according to any of claims 1 to 3, wherein said conveying chain (3) is running by two steps at a time, such that at each 'shot' of the machine, respective rows of molds (A and B) will be brought into position under the different operating units (6,7,10,11,8) of the machine.

5. A method of making double-flavor ices, in particular ice lollies, such as water ices and the like, comprising the steps of:
    causing parallel rows of molds (A) interposed between rows of molds (B) to intermittently advance through a freezing tank (2), the cross-section of a mold (A) being inscribable into the corresponding cross-section of a mold (B);
    filling the molds in each row of molds (A) with a given product;
    inserting sticks into molds in each row of molds (A);
    performing intermediate withdrawal of products from molds in rows of molds (A) and releasing them into molds in corresponding rows of molds (B);
    filling spaces existing between the inner wall of molds (B) and the outer surface of products charged therein which were withdrawn from molds (A); and finally
    withdrawing products from molds in rows of molds (B).

6. The method according to claim 5, wherein at each intermittent advance of rows of molds (A, B) through the freezing tank (2), each row of molds (A or B) are brought to a position previously occupied by a row of the same type of molds (A or B) immediately preceding them.

* * * * *